(12) United States Patent
Kuo et al.

(10) Patent No.: US 6,292,244 B1
(45) Date of Patent: Sep. 18, 2001

(54) MANUFACTURING METHOD OF FORMING TWO-DOMAIN LIQUID CRYSTAL DISPLAY BY EXPOSING A PART OF THE ORIENTATION LAYER TWICE

(75) Inventors: Chen-Lung Kuo, Hsinchu; Hong-Da Liu, Chu Pei; Chung-Kuang Wei, Hsinchu, all of (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 0 days.

(21) Appl. No.: 09/615,069

(22) Filed: Jul. 12, 2000

Related U.S. Application Data

(62) Division of application No. 09/009,184, filed on Jan. 20, 1998.

(51) Int. Cl.[7] .................................................. G02F 1/1337
(52) U.S. Cl. ........................... 349/129; 349/124; 349/191
(58) Field of Search .................................... 349/129, 124, 349/191

(56) References Cited

U.S. PATENT DOCUMENTS

| | | | |
|---|---|---|---|
| 5,280,375 | * 1/1994 | Tsuda et al. | 359/76 |
| 5,309,264 | 5/1994 | Lien et al. | 359/87 |
| 5,541,753 | 7/1996 | Raynes et al. | 359/94 |
| 5,576,862 | * 11/1996 | Sugiyama et al. | 359/75 |
| 5,576,863 | 11/1996 | Aoki et al. | 359/76 |
| 5,612,450 | * 3/1997 | Mizushima et al. | 528/353 |
| 5,657,102 | * 8/1997 | Mizushima et al. | 349/124 |
| 5,657,105 | * 8/1997 | McCartney | 349/157 |
| 5,666,179 | 9/1997 | Koma | 349/143 |
| 5,745,206 | 4/1998 | Koike et al. | 349/129 |
| 5,757,455 | 5/1998 | Sugiyama et al. | 349/129 |
| 5,796,458 | * 8/1998 | Koike et al. | 349/126 |
| 5,859,682 | * 1/1999 | Kim et al. | 349/124 |
| 5,895,106 | 4/1999 | Vander Ploeg et al. | 349/120 |
| 5,909,265 | * 6/1999 | Kim et al. | 349/129 |
| 5,953,091 | 9/1999 | Jones et al. | 349/129 |
| 6,040,885 | 3/2000 | Koike et al. | 349/129 |
| 6,081,313 | * 6/2000 | Kim | 349/129 |

* cited by examiner

*Primary Examiner*—William L. Sikes
*Assistant Examiner*—Tarifur R. Chowdhury
(74) *Attorney, Agent, or Firm*—McDermott, Will & Emery

(57) ABSTRACT

The present invention is provided a two-domain vertical aligned LCD with negative compensator. The liquid crystal molecules in each of the liquid crystal domains are orientated nearly perpendicular to surfaces of the transparent substrates with a little pre-tilted angle to the normal of said substrates when an electric field is not applied, the tilt angle projected on the azimuthal of substrate between the orientation of liquid crystal molecules in two domains are not equal to 180 degree, and the orientation of said liquid crystal molecules in two domains are oriented opposed direction. The structure that described above is obtained by ultraviolet exposure process.

4 Claims, 6 Drawing Sheets

One pixel

MANUFACTURING METHOD OF FORMING TWO-DOMAIN LIQUID CRYSTAL DISPLAY BY EXPOSING A PART OF THE ORIENTATION LAYER TWICE

This application is a Divisional of Application Ser. No. 09/009,184, filed Jan. 20, 1998.

BACKGROUND OF THE INVENTION

1. Field of the Invention

The present invention relates to the general field of Liquid Crystal Displays, and more specially to a method of increasing viewing angle and response speeds on a two-domain Chiral Homeotropic LCD with negative compensator.

2. Description of the Prior Art

Currently, the market for LCDs is increasing rapidly. However, the viewing angle and contrast ratio of LCDs are still insufficient for their use in large screen products. For high image quality, these characteristics need to be improved. The Fujitsu Ltd. has proposed a vertical-alignment-mode LCD, recently. Please see the reference "K. Ohmuro, S. Kataoka. T. Sasaki, Y. Koike SID'97 DIGEST p845~p848". The VA-LCD(vertically aligned LCD) has been implemented by optimizing a vertically aligned mode with a domain-divided structure and an optical compensator. This vertical-alignment-mode LCD has a wide viewing angle of over 70°, a fast response(<25 ms), and a high contrast ratio of over 300, but it still remains some problems. There are disadvantages, for example, the formation of two domain structure by using mask and rubbing process are complex and expensive, the rubbing process also produce ESD (Electrostatic Damage) and particles, further a mask rubbing will result image sticking.

SUMMARY OF THE INVENTION

It is an object of the present invention to solve the aforementioned problems. Another objection of this invention is to provide a method of increasing the viewing angle and response speeds on a two-domain Chiral Homeotropic LCD with negative compensator without a rubbing treatment.

These objects have been achieved by forming a two-domain vertical aligned mode LCD. Further, let the liquid crystal molecules in each of the liquid crystal domains are orientated nearly perpendicular to surfaces of the substrates with a little pre-tilted angle to the normal of the substrates when an electric field is not applied, the tilt angle projected on the azimuthal of substrate between the orientation of liquid crystal molecules in two domains are not equal to 180 degree.

To achieve the aforementioned liquid crystal molecules conditions, there are two methods can be provided. One is using an oblique incident linear polarized ultraviolet light beam process with mask shift to expose the orientation layer twice and forming two-domain structure. Another is using two linear polarized ultraviolet light beam incidents from different direction and a fixed mask to expose the orientation layer in the same time.

These methods can increase the response speed of the liquid crystal molecules and provide a rapid and clean process to avoid the disadvantages that mentioned in the background.

DESCRIPTION OF THE PREFERRED EMBODIMENT

The present invention will be described in detail with reference to drawings. The purpose of the present invention is to provide a method of increasing viewing angle on a two-domain Chiral Homeotropic LCD with negative compensator. The detail processes will be described as follows.

Figure 1B:
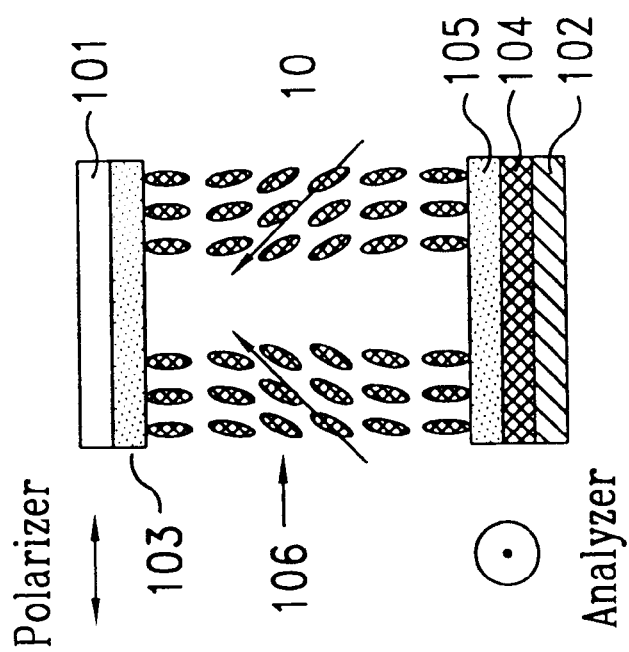
FIG. 1b is a fragmentary sectional view of an UV-type two-domain Chiral Homeotropic LCD with negative compensator in ON state according to the present invention.
Figure 1A:
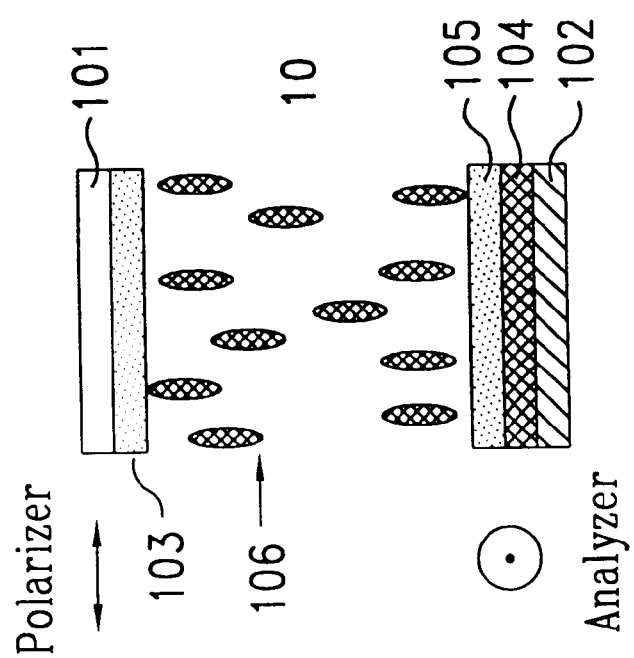
FIG. 1a is a fragmentary sectional view of an UV-type two-domain (Chiral Homeotropic LCD with negative compensator in OFF State according to the present invention.

FIG. 1a shows the panel structure of an UV-type (Ultra Violet-type) two-domain Chiral Homeotropic LCD with negative compensator in OFF state.

Referring to FIG. 1a, the basic parts of a liquid crystal are illustrated in cross section. A number of layers are involved, the outermost being a pair of light polarizers, polarizer 101 and analyzer 102. In their most commonly used configuration, the polarizer and analyzer 102 are arranged so as to have their optic axes orthogonal to one another. That is, in the absence of anything else between them, light passing through the polarizer 101 would be blocked by the analyzer 102, and vice versa.

Below the polarizer 101 is an upper transparent insulating substrate (usually glass) 103 and immediately above the analyzer 102 is a negative compensator 104. A similar lower substrate 105 located above the negative compensator 104, transparent conducting lines usually comprising indium tin oxide (ITO) run orthogonal to one another and are located on the lower surface of upper substrate and the upper surface of the lower substrate, respectively.

Sandwiched between, and confined there by means of suitable enclosing walls (not shown), is a layer of liquid crystal 106 such as, Chiral Homeotropic liquid crystal molecules. The Chiral Homeotropic liquid crystal molecules together with substrates to form a vertical aligned cell 10. The orientation of these molecules, can be controlled by coating such a surface with suitable orientation layer and formed by a LPUV (Linearly-Polarized Ultra-Violet) process. The orientation layers are formed on the substrates and contact with the liquid crystal layers 106.

The panel structure that shown in FIG. 1a is in dark state(off state), the liquid crystal molecules are homeotropic orientated. After a negative compensator 102 is formed, we found that the viewing-angle dependence light leakage is small.

FIG. 1b shows the panel structure of an UV-type(Ultra Violet-type) two-domain Chiral Homeotropic LCD with negative compensator in ON state. The liquid crystal molecules are chiral nematic. Because the liquid crystal molecules are chiral nematic orientated so the color dispersion is small. Further, the two-domain structure can make the gray-scale viewing angle very large with no inversion.

Figure 2A:
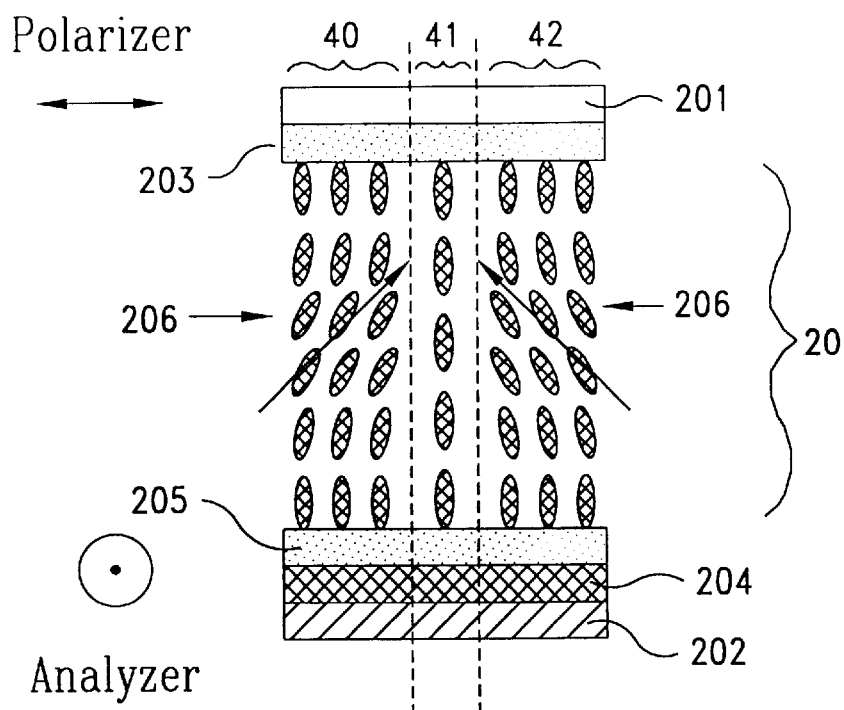
FIG. 2a is a fragmentary sectional view of a two-domain VA(Vertical Aligned) mode LCD with negative compensator according to the present invention.

FIG. 2a is a fragmentary cross section view of a two-domain VA(Vertical Aligned) mode LCD with negative compensator. Still referring to FIG. 2a, there is a detail illustration of a LCD panel structure especially to the orientation of liquid crystal molecules. In this figure, the LCD panel is in on-state the liquid crystal molecules 206 are chiral nematic orientated, and there are two domains with an overlap region in one pixel. The tilt direction (azimuthal) of liquid crystal molecules in overlap region 41 has a angle φ that is not equal to 90 degrees (it can be greater or less than 90 degrees) with respect to the tilt direction of the liquid crystal molecules in domains 40 and 42.

Figure 2B:
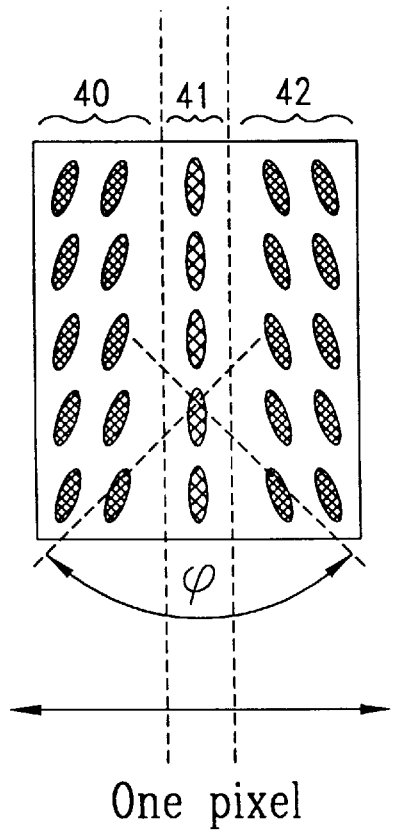
FIG. 2b is a top view of a two-domain VA(Vertical Aligned) mode LCD with negative compensator according to the present invention.

FIG. 2b is a top view of a two-domain VA (Vertical Aligned) mode LCD with negative compensator 204, the tilt angle φ that project on the azimuthal of substrate between the orientation of liquid crystal molecules in domains 40 and 42 are not equal to 180 degree (it can greater or less than 180 degree). In this embodiment, the liquid crystal molecules in each domain are orientated nearly perpendicular to the surface of substrates with a little pre-tilted angle to the normal of the substrates when an electrode field is not applied (OFF state). The tilt-angle of the liquid crystal molecules that project on the azimuthal of the substrate between the orientation of liquid crystal molecules in two domains is not equal to 180 degree.

The pre-tilted angle of the two-domain vertical aligned liquid crystal molecules in domains 40, 42 and the overlap area 41 strongly effect the response time of the liquid crystal molecules. Methods how to achieve this response characteristics of domain divided VA-cells will demonstrate in FIG. 5a~FIG. 6.

Figure 3:
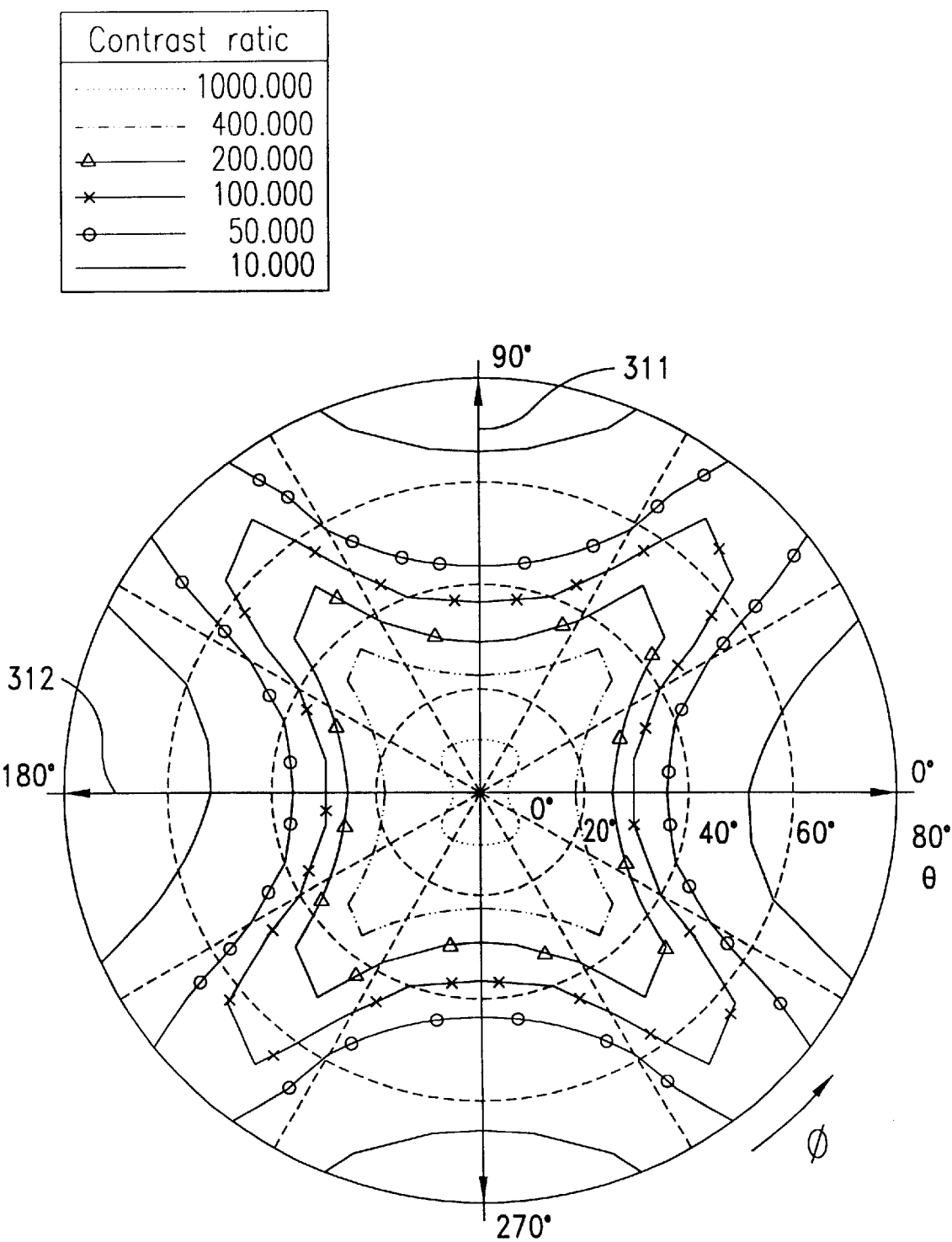
FIG. 3 and FIG. 4 the viewing angle characteristics according to the invention.

FIG. 3 is the equal contrast ratio contour. It illustrated the viewing angles of the two-domain VA mode cell according to the present invention. In FIG. 3 reference number 311 represent the polarizing axis, reference number 312 represent the analyzing axis. We have achieved a super-wide viewing angle (>70°) in all directions. In this figure φ represent the azimuthal angle, and θ represent the viewing angle.

Figure 4:
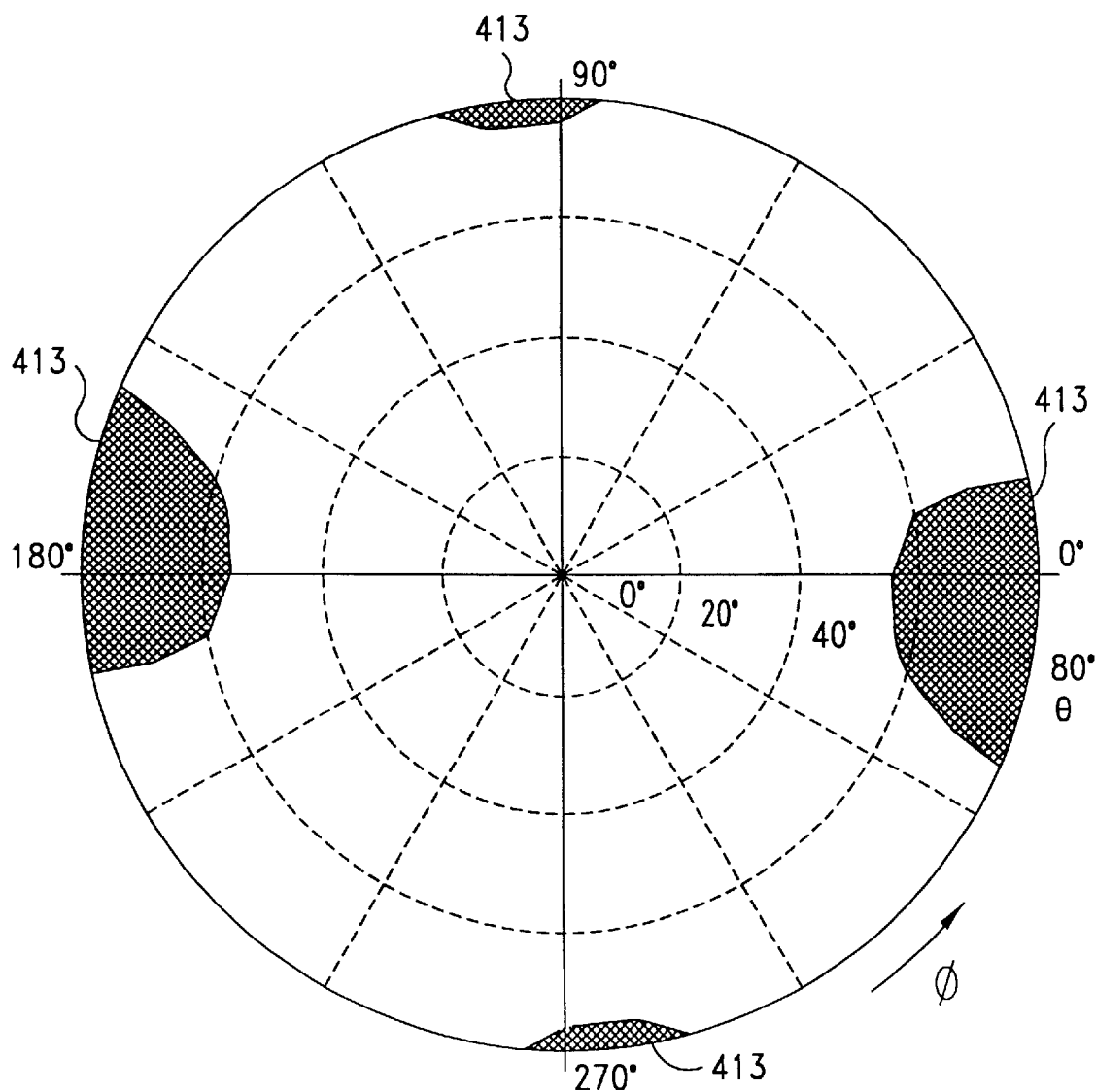

FIG. 4 is shown the evaluation of viewing angle characteristics of the present invention. In this figure, the regions with gray-level inversion 413 are small. It means the new developed two-domain VA mode LCD has very wide viewing angle characteristics with no gray-level inversion. In this figure φ represent the azimuthal angle, and θ represent the viewing angle.

Figure 5A:
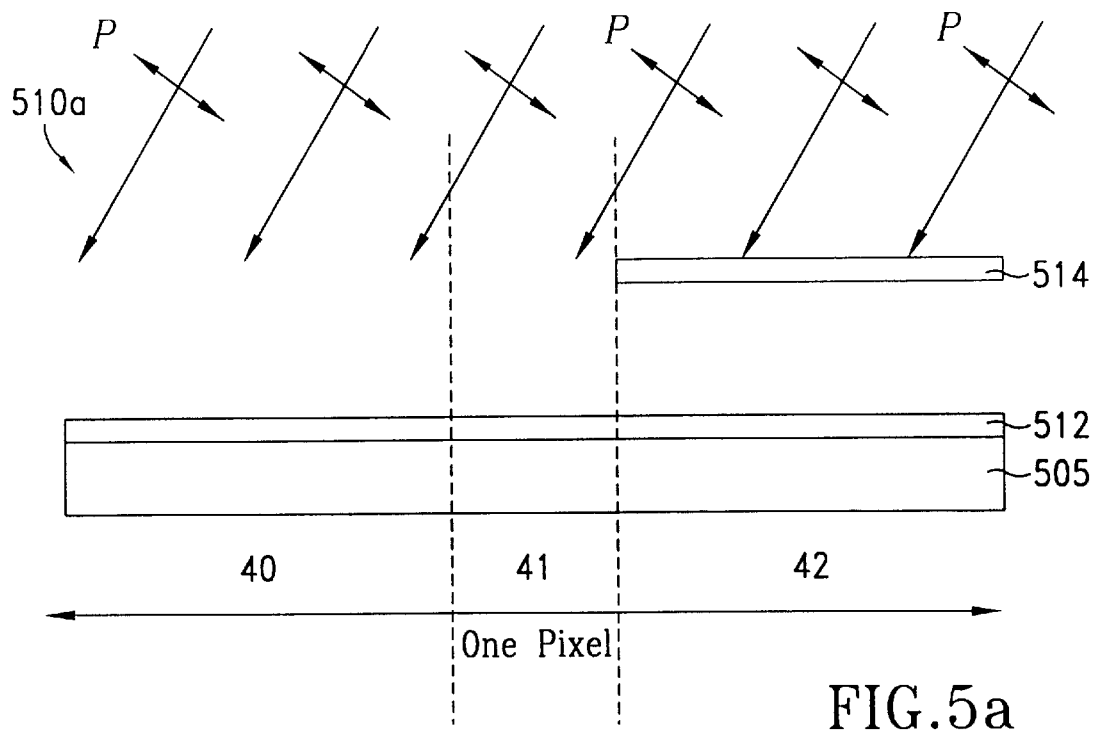
FIG. 5a and FIG. 5b are the first embodiment of the manufacture process for LPUV method according to the present invention.

FIG. 5a shows the fabrication step with a first oblique incident linearly-polarized ultraviolet light beam 510a to expose the orientation layer 512 (some kind of polymer such as polyimide). The orientation layer 512 is located on the transparent substrate (class) 505, using a mask 514 cover about half pixel of the panel, then a first oblique linearly-polarized ultraviolet light beam 510a expose the area 40 and area 41 on the orientation layer (polyimide) 512.

Figure 5B:
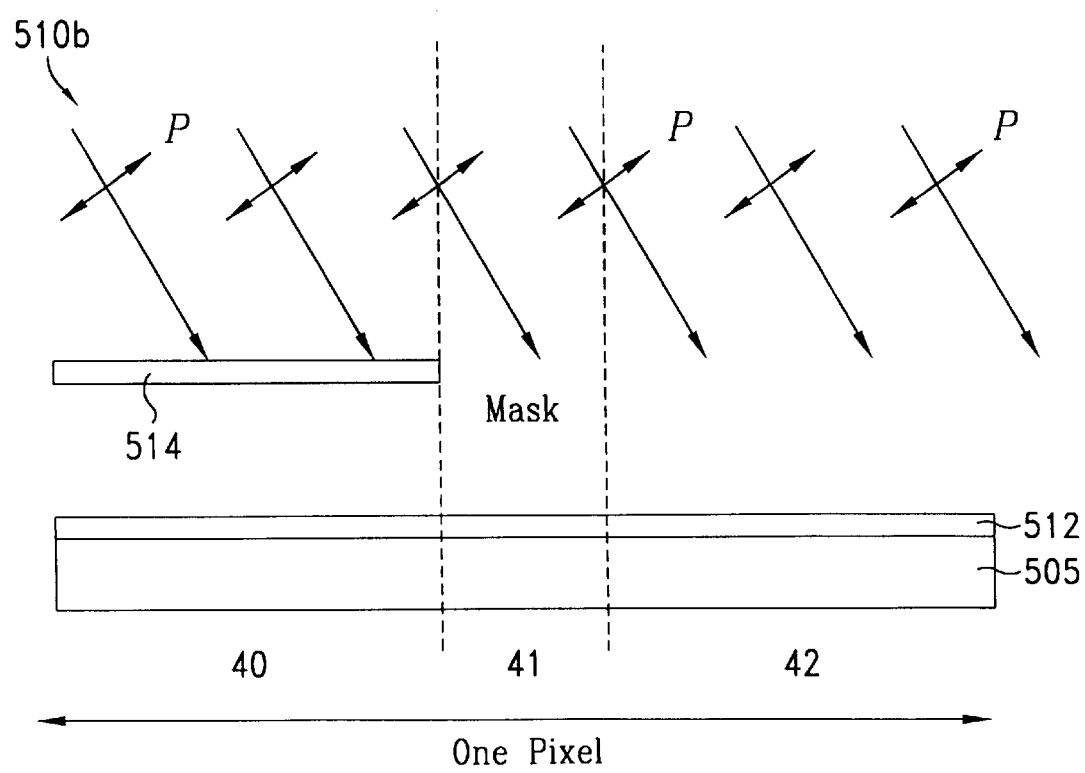

FIG. 5b shows the fabrication step with a second oblique incident linearly-polarized ultraviolet light beam 510b to expose the orientation layer 512 (some kind of polymer such as polyimide). The orientation layer 512 is located on the transparent substrate (glass) 505. The mask 514 that covered in the first step shifts about half pixel of the panel, then a second oblique linearly-polarized ultraviolet light beam 510b expose the area 41 and area 42 on the orientation layer 512. In this preferred embodiment, the orientation layer can be chosen from the group of polyimid, photo-aligned polymer, etc. According to the result that reported on "Y. Limura, S. Kobayashi SID 97 Digest P311~P314", the pre-tilted angle of polymer films depend on the exposure energy of ultraviolet light beam, and the liquid crystal alignment direction on UV-exposed polymer film is parallel to the exposed UV polarization.

The photo-alignment technique described above can control the liquid crystal alignment. The area 41 is exposed to LPUV light beam two times, the pre-tilted angle will a little bit greater than in area 40 and area 42, so the pre-tiled angle of liquid crystal can be controlled by the exposed time of LPUV. The liquid crystal molecules in area 40, area 41, and area 42 form a continuous pattern, and the response time will become shorter than the prior art.

In this present invention we use two step LPUV-exposed (Linear Polarized ultraviolet-exposed) process to form the two-domain VA mode LCD.

Figure 5C:
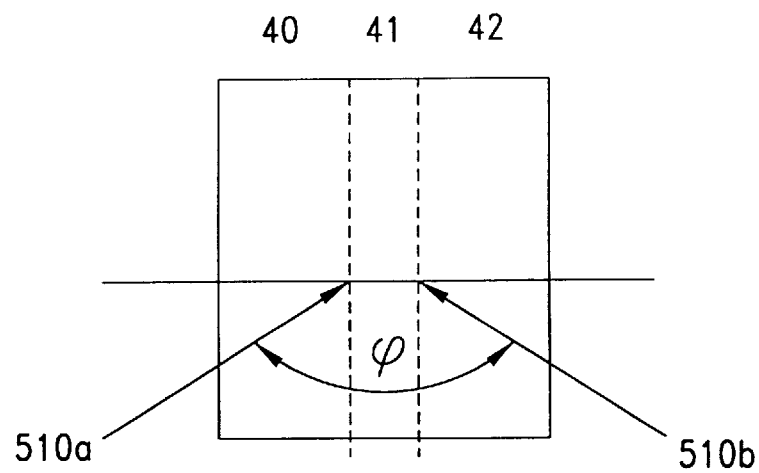
FIG. 5c the azimuthal angle $\phi$ between two incident LPUV light beams according to the present invention.

Referring to FIG. 5c, we control the azimuthal angle φ between two incident LPUV light beams (510a and 510b) not equal 180 degree, so the liquid crystal molecules in the overlap region 41 of domains 40 and 42 will incline in the same direction. The response time of the liquid crystal molecules has a great chance to become short.

Figure 6:
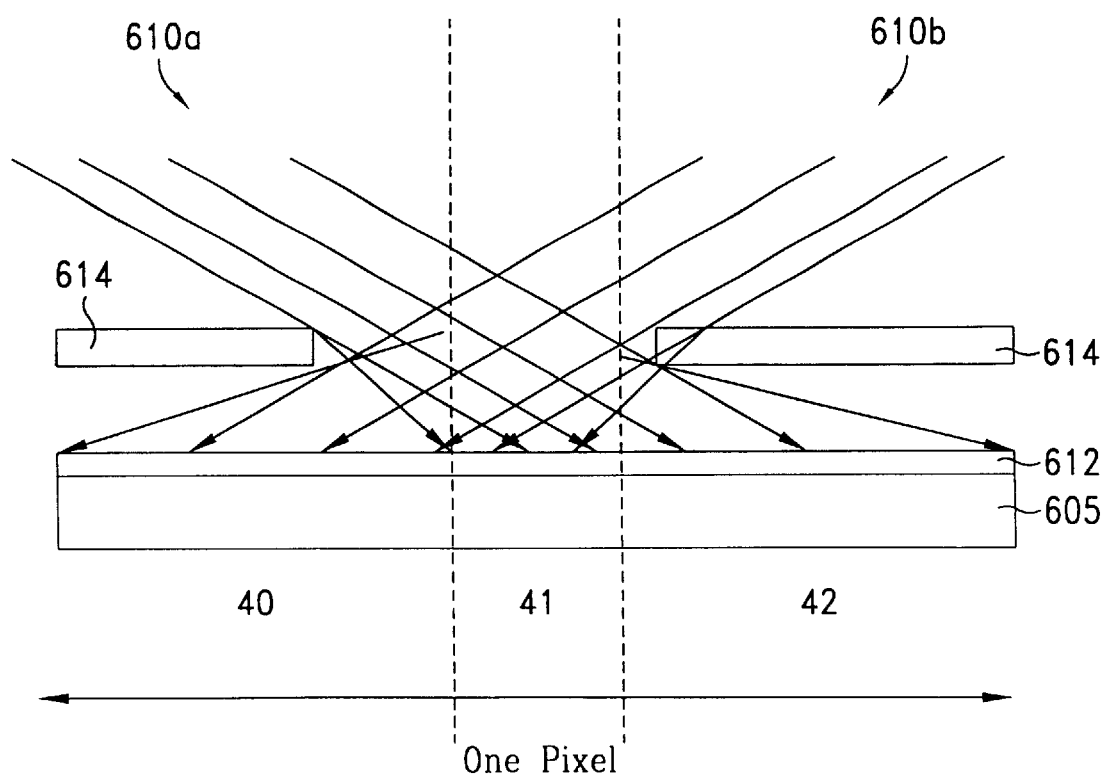
FIG. 6 is the second embodiment of the manufacture process for LPUV method according to the present invention.

FIG. 6 shows the second embodiment of the manufacture process for LPUV method according to the present invention. In this embodiment, we incident two LPUV light beams (610a and 610b) simultaneously to expose the orientation layer 612 (some kind of polymer such as polyimide). The orientation layer 612 is located on the transparent substrate (glass) 605. The mask 614 with an aperture that arranged to let 610a can expose on the area 41 and area 42, 610b can expose on the area 40 and area 41, simultaneously. Also, we control the azimuthal angle φ between two incidents LPUV light beams that are not equal 180 degree, so the liquid crystal molecules in the overlap region of two domains (i.e. area 41) will incline in the same direction. The response time of the liquid crystal molecules has a great chance to become fast. The expose light source is not limited to use linearly polarized ultraviolet light, an ultraviolet light also has the same effect. Besides, for a ultraviolet light source the orientation layer also can be chosen from the group of PVC, PVMC, PVCN-F and polysiloxane, etc.

According to the UV-type two-domain VA mode LCD that we developed and illustrated above, the orientation of the LC molecules projected on the surface of each domain are not equal to 180 degree, this structure will make the response speed of LC molecules become fast in the overlap area. Further, the linearly polarized ultraviolet manufacturing process will provide a fast and clean process to form a domain divided VA-cells without the rubbing steps and can avoid the generation of electrostatic charges and dusts during the process.

As is understood by a person skilled in the art, the foregoing preferred embodiment of the present invention that are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure. For example, the method that we propose in this invention can also be applied in reflect-type liquid crystal display.

What is claimed is:

1. A method of forming an ultraviolet type two-domain liquid crystal display comprising:

providing a substrate, said substrate having an orientation layer located thereon;

providing a mask, said mask covering said orientation layer less than about a half pixel, said two-domain liquid crystal display are defined by said mask;

performing a first exposure on parts of said orientation layer uncovered by a first oblique incident ultraviolet light beam;

shifting said mask to cover another less than a half pixel of said orientation layer; and performing a second exposure on parts of said orientation layer by a second oblique incident ultraviolet light beam, said orientation layer with an area being exposed twice by said first exposure and said second exposure.

2. The method of claim 1, wherein said orientation layer is chosen from the group of polyimide, photo-aligned polymer, PVC, PVMC, PVCN-F and polysiloxane.

3. The method of claim 1, wherein the azimuthal angle between said first oblique incident ultraviolet light beams and said second oblique incident ultraviolet light beams are not equal 180 degree.

4. The method of claim 1, wherein said first oblique incident ultraviolet light beam and said second oblique incident ultraviolet light beam are incident in the same incident plane with different incident direction.

* * * * *